US008607252B2

(12) United States Patent
Bernardes et al.

(10) Patent No.: US 8,607,252 B2
(45) Date of Patent: Dec. 10, 2013

(54) AUTOMATED LAMP STACK MIGRATION

(75) Inventors: Murillo Fernandes Bernardes, Campinas (BR); Rodrigo Ceron Ferreira de Castro, Campinas (BR); Alex Zanetti de Lima, Americana (BR); Andre Fernandes de Macedo, Campinas (BR); Paulo Ricardo Paz Vital, Campinas (BR); Luke Matthew Browning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/332,715

(22) Filed: Dec. 11, 2008

(65) Prior Publication Data

US 2010/0153972 A1 Jun. 17, 2010

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/319; 709/220

(58) Field of Classification Search
USPC .................................. 719/319; 709/220, 224
See application file for complete search history.

(56) References Cited

U.S. PATENT DOCUMENTS

| 6,735,691 | B1 * | 5/2004 | Capps et al. ...................... 713/1 |
| 7,284,043 | B2 * | 10/2007 | Feinleib et al. ............... 709/220 |
| 7,337,435 | B2 * | 2/2008 | Bell et al. ...................... 717/136 |
| 7,379,996 | B2 * | 5/2008 | Papatla et al. ................. 709/224 |
| 2006/0005162 | A1 * | 1/2006 | Tseng et al. ................... 717/107 |
| 2006/0064474 | A1 * | 3/2006 | Feinleib et al. ............... 709/220 |
| 2008/0270564 | A1 * | 10/2008 | Rangegowda et al. ........ 709/212 |
| 2009/0217163 | A1 * | 8/2009 | Jaroker ......................... 715/700 |

OTHER PUBLICATIONS

Doc Searls; "How High is the LAMP Stack?", www.linuxjournal.com/node/1000253; created Jul. 31, 2007.

Danny Bradbury; "Open Source: Where the LAMP Stacks Burn Brighest"; www.silicon.com/research/specialreports/opensource/0,3800004943,39130613,00.htm; Published Jun. 29, 2005.

* cited by examiner

Primary Examiner — Diem Cao
(74) Attorney, Agent, or Firm — Steven M. Greenberg, Esq.; Carey, Rodriguez, Greenberg & O'Keefe

(57) ABSTRACT

Embodiments of the present invention provide a method, system and computer program product for automated LAMP stack data migration. In an embodiment of the invention, a method for automated LAMP stack data migration can be provided. The method can include retrieving a profile for a LAMP stack executing in a source operating platform, selecting a LAMP stack for deployment onto a target operating platform and deploying the selected LAMP stack onto the target operating platform. The method further can include translating the retrieved profile for compatibility with the selected LAMP stack, directing a reboot of the target operating platform, and applying the translated profile to the target operating platform.

14 Claims, 2 Drawing Sheets

AUTOMATED LAMP STACK MIGRATION

BACKGROUND OF THE INVENTION

1. Field of the Invention

The present invention relates to the field of application migration and more particularly to Linux-Apache-MySQL-PHP/Perl/Python (LAMP) stack data migration.

2. Description of the Related Art

The acronym LAMP refers to a computing solution stack of different computer programs supporting dynamic content distribution and network distributable applications. LAMP, as it is known in the art, originates from the arrangement of a Linux flavored operating system, an Apache type Web server; a MySQL database management system and a scripting interpreter such as personal home page (PHP) interpreter, or a programming extraction and reporting language (PERL) interpreter, or a Python interpreter, to name a few. This arrangement defines a Web server infrastructure and a programming paradigm of developing applications accessible through the Web server infrastructure. Of note, the programmatic components of the LAMP stack are open-source components and have become popular because of the low cost of acquisition of each component and because of the ubiquity of each component which often are bundled together in a single Linux distribution irrespective of the flavor of Linux.

Though the LAMP stack provides the advantage of a low cost of acquisition, the total cost of ownership of a LAMP stack supported solution can be significant. In this regard, a degree of expertise often is required to deploy and maintain a LAMP stack supported solution which generally requires a substantially skilled information technology workforce. In this regard, while configuring a Linux distribution for the specific architecture of a host operating platform can be a substantial endeavor alone, configuring each component of the LAMP stack for interoperability with one another and to accommodate the specific architecture of a host operating platform can be even more of a significant endeavor. The problem of managing a LAMP stack supported solution in one host operating platform can be compounded when migrating a LAMP stack supported solution from one operating platform to another.

Currently, when migrating a LAMP stack supported solution from one host operating platform to another, the system administrator first must manually copy the configuration and data files of the LAMP stack from the source operating platform to the target operating platform. Additionally, the system administrator must translate the configuration files to accommodate the nature of the target operating platform. As it is understood in the art, however, the LAMP stack requires a high degree of customization. In consequence, manually translating the configuration files to accommodate the nature of the target operating platform can be an error prone process, even for the most skilled system administrator. Additionally, the migration of the LAMP stack in many cases requires the upgrade of the operating system of the target operating platform from one operating system level to another.

BRIEF SUMMARY OF THE INVENTION

Embodiments of the present invention address deficiencies of the art in respect to the manually migration of a LAMP stack and provide a novel and non-obvious method, system and computer program product for automated LAMP stack data migration. In an embodiment of the invention, a method for automated LAMP stack data migration can be provided. The method can include retrieving a profile for a LAMP stack executing in a source operating platform, selecting a LAMP stack for deployment onto a target operating platform and deploying the selected LAMP stack onto the target operating platform. The method further can include translating the retrieved profile for compatibility with the selected LAMP stack, directing a reboot of the target operating platform, and applying the translated profile to the target operating platform.

In one aspect of the embodiment, retrieving a profile for a LAMP stack executing in a source operating platform can include placing a migration daemon onto the source operating platform to retrieve the profile, and receiving the profile from the migration daemon. In another aspect of the embodiment, selecting a LAMP stack for deployment onto a target operating platform can include selecting a Linux distribution from amongst a plurality of Linux distributions in a data store of Linux distributions. In yet another aspect of the embodiment, translating the retrieved profile for compatibility with the selected LAMP stack can include mapping a configuration for the LAMP stack on the source operating platform to a requisite corresponding configuration for the selected LAMP stack, and copying user account information and user data for the LAMP stack on the source operating platform. In even yet another aspect of the embodiment, translating the retrieved profile for compatibility with the selected LAMP stack can include applying a translation pack corresponding to the selected LAMP stack to the retrieved profile.

In another embodiment of the invention, a migration data processing system can be configured for automated LAMP stack data migration. The system can include a host server configured for communicative coupling to each of a source operating platform supporting an executing LAMP stack, a target operating platform, and a bootstrap protocol (BOOTP) server over a computer communications network. The system also can include an automated LAMP data migration module executing in the host server. The module can include program code enabled to retrieve a profile for the LAMP stack executing in the source operating platform, to select a LAMP stack for deployment onto the target operating platform, to deploy the selected LAMP stack onto the target operating platform, to translate the retrieved profile for compatibility with the selected LAMP stack, to reboot the target operating platform using the BOOTP server to bootstrap the target operating platform, and to apply the translated profile to the target operating platform. Optionally, the system can include a migration daemon under control of the automated LAMP data migration module and configured for placement in the source operating platform to retrieve the profile for the LAMP stack executing in the source operating platform.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated LAMP stack data migration. In accordance with an embodiment of the present invention, an existing LAMP stack in a source computing platform can be analyzed to retrieve an operating profile for the existing LAMP stack, including configuration data particular to the existing LAMP stack in the source computing platform. Once retrieved, the operating profile can be translated into a form compatible with a designated target computing platform. A new LAMP stack can be deployed to the target computing platform and the target computing platform can be booted into operation. Finally, the translated operating profile can be applied to the target computing platform.

Figure 1:
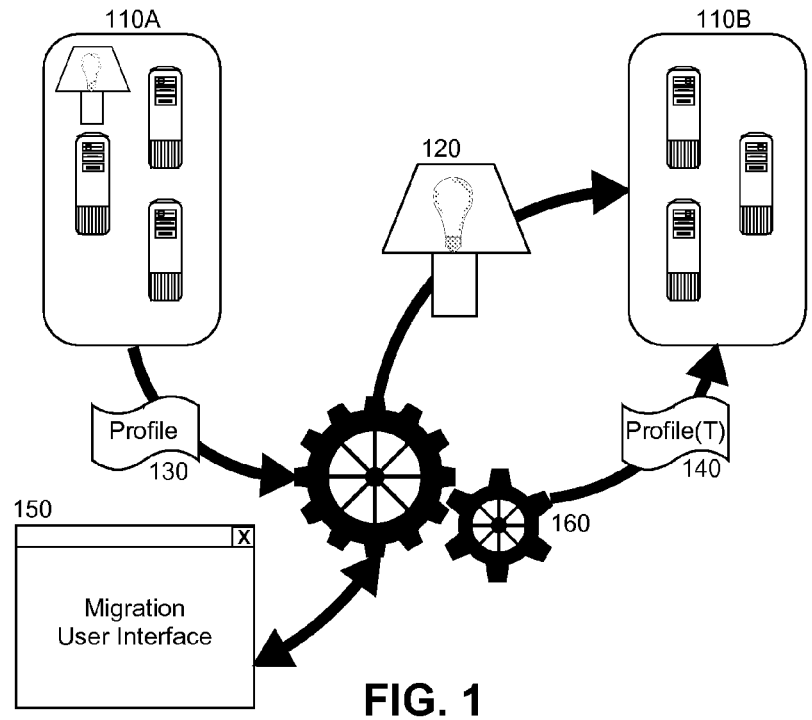
FIG. 1 is a pictorial illustration of a process for automated LAMP stack data migration.

In illustration, FIG. 1 pictorially shows a process for automated LAMP stack data migration. As shown in FIG. 1, a source operating platform 110A including one or more servers can host the execution of a LAMP stack. Initially, a migration data processing system 160 configured for automated LAMP stack data migration can identify a profile 130 for the LAMP stack in the source operating platform 110A including operating system version information, user account information, user data and the like. The migration data processing system 160 further can translate the profile 130 to a translated profile 140 compatible with a target operating platform 110B specified through migration user interface 150, for example by way of Internet protocol (IP) address, host name and so forth. Thereafter, a LAMP stack 120 can be deployed onto the target operating platform 110B and configured according to the translated profile 140. In this way, the LAMP stack 120 can be migrated in an automated fashion without requiring tedious manual configuration of the LAMP stack 120 in the target operating platform.

Figure 2:
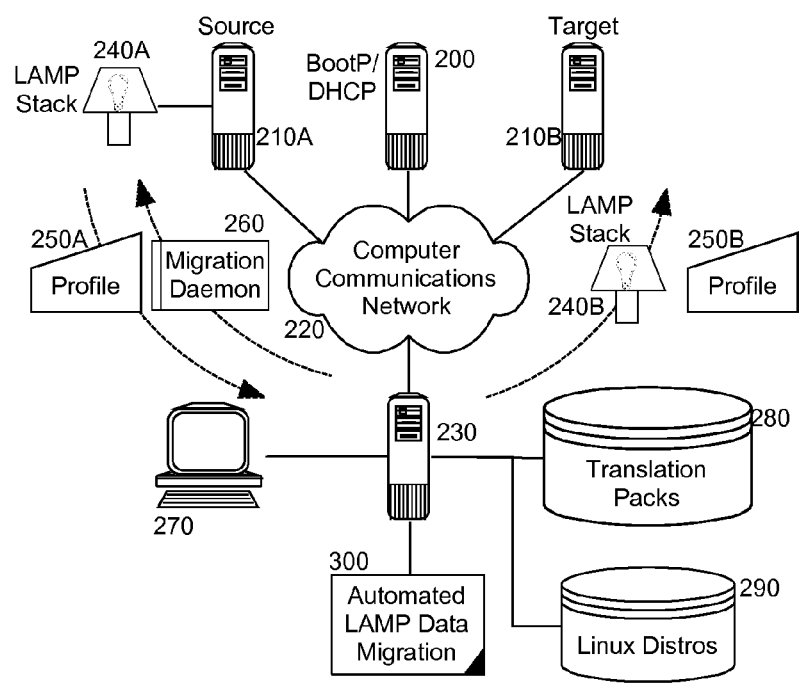
FIG. 2 is a schematic illustration of a migration data processing system configured for automated LAMP stack data migration; and, FIG. 3 is a flow chart illustrating a process for automated LAMP stack data migration.

In more particular illustration, FIG. 2 schematically shows a migration data processing system configured for automated LAMP stack data migration. The system can include a host server 230 configured for communicative coupling to each of a source operating platform 210A and a target operating platform 210B (shown as a single server in each case for ease of illustration) over computer communications network 220. The host server 230 further can be configured for communicative coupling to a BOOTP server and a dynamic host configuration protocol (DHCP) server, collectively BOOTP/DHCP server 200 (again, shown as a single entity though the skilled artisan will recognize that each can be disposed separately within separate servers or appliances.

The host server 230 can be accessed through a coupled terminal 270 for instance a client supporting a Web browser. The host server 230 further can include a data store of translation packs 280 and a data store of Linux operating system distributions 290 and can support the execution of an automated LAMP data migration module 300. The data store of Linux operating system distributions 290 can include one or more different versions of the Linux operating system assembled for deployment onto a specified target operating platform. The data store of translation packs 280 can include one or more translation packs each configured to map a specific profile to a particular configuration compatible with a specified target operating platform.

The automated LAMP data migration module 300 can include program code enabled to render a user interface in terminal 270 through which both a source operating platform 210A with installed LAMP stack 240A and also a target operating platform 210B can be specified. The user interface in terminal 270 further can permit a selection of a particular Linux distribution in the data store of Linux distributions 290 for deployment as a LAMP stack 240B onto the target operating platform 210B. The program code of the automated LAMP data migration module 300 further can be enabled to install a migration daemon 260 onto the source operating platform 210A specified through the user interface in order to identify a profile 250A of the LAMP stack 240A.

In this regard, the migration daemon 260 can issue directives within the source operating platform 210A in order to retrieve required information for the profile 250A such as a configuration for each component of the LAMP stack 240A, user account information for accessing the LAMP stack 240A and user data used in the LAMP stack 240A. The migration daemon 260 also can listen for requests from the automated LAMP migration module 300 and can alert the automated LAMP data migration module 300 when the requisite data for the profile 250A has been retrieved. Finally, the migration module 300 can receive the profile 250A from the migration daemon 260.

The program code of the automated LAMP data migration module 300 yet further can be enabled to locate a translation pack within the data store of translation packs 280 so as to translate the profile 250A into a profile 250B compatible with the target operating platform 210B specified by way of the user interface. Specifically, the mapping of the profiles 250A, 250B can account for versioning difference between the different LAMP stacks 240A, 240B, and nuances specific to a particular LAMP stack. The program code of the automated LAMP data migration module 300 even yet further can be enabled to reboot the target operating platform 210B, using the BOOTP/DHCP server 200 to bootstrap the target operating platform. Finally, the program code of the automated LAMP data migration module 300 can be enabled to apply the profile 250B to the target operating platform 210B by copying requisite configuration files and data for the profile 250B into the target operating platform 210B in connection with the deployed LAMP stack 240B. However, when a network connection is active between the source operating platform 210A and the target operating platform 210B, over the computer communications network 220, the data can be copied directly between the source operating platform 210A and the target operating platform 210B without passing through the LAMP migration module 300.

Figure 3:
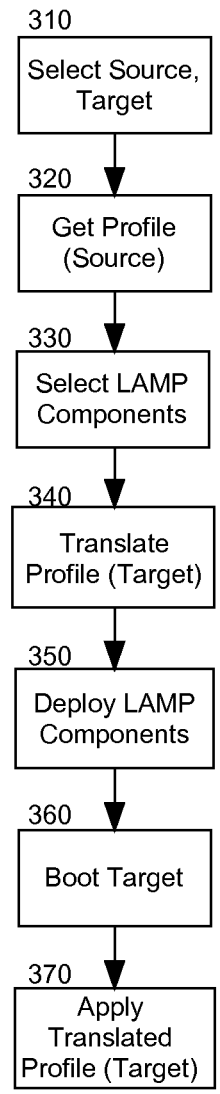

In yet further illustration of the operation of the automated LAMP data migration module, FIG. 3 is a flow chart illustrating a process for automated LAMP stack data migration. Beginning in block 310, a source operating platform and target operating platform can be selected. In block 320, a profile for the source operating platform can be acquired, for example by way of a daemon placed into the source operating platform. In block 330, LAMP components for the target operating platform can be selected—namely a particular Linux distribution at a particular version level. In block 340, the retrieved profile can be translated for compatibility with the selected LAMP components in the target operating platform In block 350, the selected LAMP components can be deployed to the target operating platform. Thereafter, the target operating platform can be rebooted in block 360. Finally, in block 370 the translated profile can be applied to the rebooted target operating platform in which the deployed LAMP components now reside. Consequently, the entire process of migrating a LAMP stack from one operating platform to another can be automated while requiring only a minimum of manual intervention.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for automated Linux-Apache-MySQL-PHP/Perl/Python (LAMP) stack data migration, the method comprising:

analyzing a LAMP stack executing in a source operating platform to retrieve a profile for the LAMP stack, wherein the profile includes a configuration for each component of the LAMP stack, comprising a configuration for a Linux type operating system, a configuration for an Apache type Web server, a configuration for a MySQL type database management system, and a configuration for a PHP/Perl/Python script execution environment;

selecting a LAMP stack for deployment onto a target operating platform;

translating the retrieved profile for compatibility with the selected LAMP stack and the target operating platform;

deploying the selected LAMP stack onto the target operating platform;

directing a reboot of the target operating platform using a bootstrap protocol (BOOTP) server to bootstrap the target operating system; and, applying the translated profile to the target operating platform.

2. The method of claim 1, wherein retrieving a profile for a LAMP stack executing in a source operating platform, comprises:

placing a migration daemon onto the source operating platform to retrieve the profile; and, receiving the profile from the migration daemon.

3. The method of claim 1, wherein selecting a LAMP stack for deployment onto a target operating platform, comprises selecting a Linux distribution from amongst a plurality of Linux distributions in a data store of Linux distributions.

4. The method of claim 1, wherein translating the retrieved profile for compatibility with the selected LAMP stack, comprises:

mapping a configuration for the LAMP stack on the source operating platform to a requisite corresponding configuration for the selected LAMP stack; and, copying user account information and user data for the LAMP stack on the source operating platform.

5. The method of claim 1, wherein translating the retrieved profile for compatibility with the selected LAMP stack, comprises applying a translation pack corresponding to the selected LAMP stack to the retrieved profile.

6. A migration data processing system configured for automated Linux-Apache-MySQL-PHP/Perl/Python (LAMP) stack data migration, the system comprising:

a host server configured for communicative coupling to each of a source operating platform supporting an executing LAMP stack, a target operating platform, and a bootstrap protocol (BOOTP) server over a computer communications network; and, an automated LAMP data migration module executing in the host server, the module comprising program code enabled analyze the LAMP stack executing in the source operating platform to retrieve a profile for the LAMP stack, to select a LAMP stack for deployment onto the target operating platform, to deploy the selected LAMP stack onto the target operating platform, to translate the retrieved profile for compatibility with the selected LAMP stack and the target operating platform, to reboot the target operating platform, and to apply the translated profile to the target operating platform;

wherein the profile includes a configuration for each component of the LAMP stack, comprising a configuration for a Linux type operating system, a configuration for an Apache type Web server, a configuration for a MySQL type database management system, and a configuration for a PHP/Perl/Python script execution environment.

7. The system of claim 6, further comprising a migration daemon under control of the automated LAMP data migration module and configured for placement in the source operating platform to retrieve the profile for the LAMP stack executing in the source operating platform.

8. The system of claim 6, further comprising a data store of a plurality of Linux distributions from which the selected LAMP stack is selected.

9. The system of claim 6, wherein the profile comprises a configuration for the LAMP stack executing in the source operating platform, user account information for accessing the LAMP stack executing in the source operating platform, and user data used by the LAMP stack executing in the source operating platform.

10. A computer program product comprising a computer usable storage medium storing therein computer usable program code for automated Linux-Apache-MySQL-PHP/Perl/Python (LAMP) stack data migration, the computer program product comprising:

computer usable program code for analyzing a LAMP stack executing in a source operating platform to retrieve a profile for the LAMP stack, wherein the profile includes a configuration for each component of the LAMP stack, comprising a configuration for a Linux type operating system, a configuration for an Apache type Web server, a configuration for a MySQL type database management system, and a configuration for a PHP/Perl/Python script execution environment;

computer usable program code for selecting a LAMP stack for deployment onto a target operating platform;

computer usable program code for deploying the selected LAMP stack onto the target operating platform;

computer usable program code for translating the retrieved profile for compatibility with the selected LAMP stack and the target operating platform;

computer usable program code for directing a reboot of the target operating platform using a bootstrap protocol (BOOTP) server to bootstrap the target operating system; and, computer usable program code for applying the translated profile to the target operating platform.

11. The computer program product of claim 10, wherein the computer usable program code for retrieving a profile for a LAMP stack executing in a source operating platform, comprises:

computer usable program code for placing a migration daemon onto the source operating platform to retrieve the profile; and, computer usable program code for receiving the profile from the migration daemon.

12. The computer program product of claim 10, wherein the computer usable program code for selecting a LAMP stack for deployment onto a target operating platform, comprises computer usable program code for selecting a Linux distribution from amongst a plurality of Linux distributions in a data store of Linux distributions.

13. The computer program product of claim 10, wherein the computer usable program code for translating the retrieved profile for compatibility with the selected LAMP stack, comprises:

computer usable program code for mapping a configuration for the LAMP stack on the source operating platform to a requisite corresponding configuration for the selected LAMP stack; and, computer usable program code for copying user account information and user data for the LAMP stack on the source operating platform.

14. The computer program product of claim 10, wherein the computer usable program code for translating the retrieved profile for compatibility with the selected LAMP stack, comprises computer usable program code for applying a translation pack corresponding to the selected LAMP stack to the retrieved profile.

\* \* \* \* \*